United States Patent [19]
Solondz

[11] Patent Number: 6,148,218
[45] Date of Patent: *Nov. 14, 2000

[54] ARCHITECTURE FOR MULTI-SECTOR BASE STATIONS

[75] Inventor: Max Aaron Solondz, Morris Township, Morris County, N.J.

[73] Assignee: Lucent Technologies, Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 09/023,439

[22] Filed: Feb. 13, 1998

[51] Int. Cl.⁷ .................................................. H04B 1/38
[52] U.S. Cl. ........................ 455/562; 455/101; 455/103; 455/132; 455/137; 455/273
[58] Field of Search ................................ 455/560, 561, 455/562, 504, 101, 102, 103, 104, 131, 132, 137, 272, 273; 370/319, 334, 344

[56] References Cited

U.S. PATENT DOCUMENTS 5,479,397  12/1995  Lee .......................................... 455/562
5,742,911  4/1998  Dumbrill et al. ........................ 455/562

Primary Examiner—Lee Nguyen
Attorney, Agent, or Firm—DeMont & Breyer, LLC; John Paul DeMont; Wayne S. Breyer

[57] ABSTRACT

A wireless telecommunications system base station architecture is disclosed that supports receive diversity, sectorization, and radio pooling without the need for a sniffer radio or a switching matrix between the radios and the receive antennas. An illustrative embodiment of the present invention comprises: a first receive antenna for receiving a first incoming signal; a second receive antenna for receiving a second incoming signal; a first transmit antenna for transmitting into a first sector; a second transmit antenna for transmitting into a second sector; a first switch for receiving a first outgoing signal and a first control signal, and for routing the first outgoing signal to at least one of the first transmit antenna and the second transmit antenna based on the first control signal; and a first radio for receiving the first incoming signal from the first receive antenna and the second incoming signal from the second receive antenna, and for providing the first outgoing signal and the first control signal to the first switch.

11 Claims, 6 Drawing Sheets

100

ARCHITECTURE FOR MULTI-SECTOR BASE STATIONS

FIELD OF THE INVENTION

The present invention relates to telecommunications in general, and, more particularly, to an architecture for a sectorized base station that is part of a wireless telecommunications system.

BACKGROUND OF THE INVENTION

FIG. 1 depicts a schematic diagram of a portion of a typical wireless telecommunications system, which provides wireless telecommunications service to a number of wireless terminals (e.g., wireless terminals 101-1 through 101-3) that are situated within a geographic region. The heart of a typical wireless telecommunications system is Wireless Switching Center ("WSC") 120, which might be known also as a Mobile Switching Center ("MSC") or Mobile Telephone Switching Office ("MTSO"). Typically, Wireless Switching Center 120 is connected to a plurality of base stations (e.g., base stations 103-1 through 103-5) that are dispersed throughout the geographic area serviced by the system and to the local and long-distance telephone offices (e.g. local-office 130, local-office 138 and toll-office 140). Wireless Switching Center 120 is responsible for, among other things, establishing and maintaining calls between wireless terminals and between a wireless terminal and a wireline terminal (e.g., wireline terminal 150), which wireline terminal is connected to Wireless Switching Center 120 via the local and/or long-distance networks.

The geographic area serviced by a wireless telecommunications system is divided into spatially distinct areas called "cells." As depicted in FIG. 1, each cell is schematically represented by one hexagon in a honeycomb pattern; in practice, however, each cell has an irregular shape that depends on the topography of the terrain surrounding the cell. Typically, each cell contains a base station, which comprises the radios and antennas that the base station uses to communicate with the wireless terminals in that cell and also comprises the transmission equipment that the base station uses to communicate with Wireless Switching Center 120.

For example, when wireless terminal 101-1 desires to communicate with wireless terminal 101-2, wireless terminal 101-1 transmits the desired information to base station 103-1, which relays the information to Wireless Switching Center 120. Upon receipt of the information, and with the knowledge that it is intended for wireless terminal 101-2, Wireless Switching Center 120 then returns the information back to base station 103-1, which relays the information, via radio, to wireless terminal 101-2.

FIG. 2 depicts a block diagram of a first base station architecture in the prior art, which comprises one or more radios that are capable of transmitting outgoing signals via a transmit antenna ("$T_x$") and receiving incoming signals via a receive antenna ("Rx"). According to this architecture, there is only one transmit antenna per cell that transmits omni-directionally and only one receive antenna per cell that receives omni-directionally.

Each radio in this architecture receives one incoming carrier signal via the receive antenna and demodulates that carrier signal into one or more baseband signals in accordance with the particular access scheme employed (e.g., frequency-division multiple access, time-division multiple access, code-division multiple-access, etc.). The incoming baseband signals are then transmitted to wireless switching center 120. Analogously, outgoing baseband signals from wireless switching center 120 are modulated by the radio in accordance with the particular multiplexing scheme employed (e.g., frequency-division multiplexing, time-division multiplexing, code-division multiplexing, etc.) for transmission via the transmission antenna.

When wireless telecommunications system 100 is a terrestrial system, in contrast to a satellite-based system, the quality and availability of service is subject to the idiosyncrasies of the terrain surrounding the system. For example, when the topography of the terrain is hilly or mountainous, or when objects such as buildings or trees are present, a signal transmitted by a wireless terminal can be absorbed or reflected such that the signal quality is not uniform at the base station. The result is that a base station's receive antenna can receive a direct path signal and one or more reflected signals from the wireless terminal at disparate phases such that the signals destructively interfere. This phenomenon is widely known as multipath fading or fast fading or Rayleigh fading.

FIG. 3 depicts a block diagram of a second base station architecture in the prior art, which supports a technique known as N-way receive diversity to mitigate the effects of multipath fading. The base station architecture depicted in FIG. 3 comprises one or more radios that are capable of transmitting outgoing signals via a single transmit antenna, as in the architecture of FIG. 2, but also comprises N spatially-separate receive antennas ("$Rx_1$" through "$Rx_N$"). Because multipath fading is a localized phenomenon, it is highly unlikely that all of the spatially-separated receive antennas will experience multipath fading at the same time. Therefore, if an incoming signal is weak at one receive antenna, it is likely to be satisfactory at one of the others. As is well-known in the prior art, a diversity combiner associated with the radios can combine N incoming signals, each from one of N receive antennas, using various techniques (e.g., selection diversity, equal gain combining diversity, maximum ratio combining diversity, etc.) to improve the reception of an incoming signal.

FIG. 4 depicts a block diagram of a third base station architecture in the prior art, which supports a technique for increasing the traffic capacity of the telecommunications system. This technique is known as "base station sectorization." In accordance with base station sectorization, the cell serviced by a base station is subdivided into M tessellated pie-slices, each of which comprises a 360°/M sector whose focus is at the base station. The base station architecture in FIG. 4 comprises M sets of radios and associated transmit and receive antennas, as shown, each of which operates independently of the others, except that the transmit and receive antennas associated with each sector are generally implemented so as to principally transmit into and receive from that sector.

The architecture in FIG. 4 is, however, disadvantageous because it requires more radios than necessary to support a given traffic capacity, which unnecessarily increases the cost of the base station. The same average traffic capacity can be accommodated with fewer radios if they are pooled, as depicted in FIG. 5.

FIG. 5 depicts a block diagram of a fourth base station architecture in the prior art, which supports receive diversity, sectorization, and radio pooling. The architecture comprises: a plurality of radios 501-1 through 501-Z, sniffer radio 502, switch matrix 503, and M sets of transmit and receive antennas 504-1 through 504-M, interconnected as shown. In accordance with this architecture, sniffer radio 502 scans all of the potential sectors and channels in search of incoming signals. When sniffer radio 502 detects an incoming signal from a given sector, it directs switch matrix 503 to route the incoming signals from that sector to an appropriate radio and to route the outgoing signals from that radio to the same sector. Because any radio can receive from and transmit to any sector, this architecture requires fewer radios to support the same average traffic capacity as the architecture in FIG. 4. This architecture is disadvantageous, however, in that it requires a sniffer radio and a complex M×(N+1)+2 by M×(N+1) switch matrix to be added to the base station.

Therefore, the need exists for a base station architecture that supports receive diversity, sectorization, and radio pooling and avoids some or all of the costs and disadvantages associated with architectures in the prior art.

SUMMARY OF THE INVENTION

The present invention is a base station architecture that supports receive diversity, sectorization, and radio pooling without some of the costs and disadvantages associated with base station architectures in the prior art. In particular, some embodiments of the present invention avoid the need for a sniffer radio or a switching matrix between the radios and the receive antennas. This is advantageous because it reduces the cost and size of a base station.

Not only is the cost of the sniffer radio a disadvantage, the sniffer radio in the prior art base station architecture is actually performing a disservice to the functioning of the base station. For example, in any given interval a wireless terminal engaged in a call with a radio in the base station can move from one sector to another. If the sniffer radio in the base station becomes aware of that movement too long after it has occurred, then the call might be dropped by the base station. But because the sniffer radio searches for only one incoming signal at a time, it can be a considerable amount of time before the sniffer radio detects the movement of a wireless terminal. Therefore, the sniffer radio is a bottleneck in the operation of the base station.

Furthermore, the existence of the sniffer radio and the switch matrix only allows each radio to utilize the incoming signals from one sector of receive antennas at a time, which deprives the radio of useful incoming signals that might be available at other receive antennas. Although the technique of sectorization increases the traffic capacity of the system, it is not necessary to sectorization that each radio be restricted to receiving incoming signals from only one sector's antennas. It is only necessary that the frequencies intentionally transmitted in a sector be distinct from the frequencies transmitted in adjacent sectors.

A more advantageous architecture allows each radio to receive incoming signals from all of the receive antennas at the base station and to perform diversity combining and/or beamforming on all of the incoming signals. This is advantageous because it eliminates the need for the sniffer radio and the switch matrix between the radios and the receive antennas. Furthermore, because each radio receives incoming signals from all of the receive antennas all of the time, the radio can continually monitor the movement of the wireless terminal, which effectively precludes the possibility that a call would be dropped because the radio failed to detect the movement of a wireless terminal across a sector boundary.

An illustrative embodiment of the present invention comprises: a first receive antenna for receiving a first incoming signal; a second receive antenna for receiving a second incoming signal; a first transmit antenna for transmitting into a first sector; a second transmit antenna for transmitting into a second sector; a first switch for receiving a first outgoing signal and a first control signal, and for routing the first outgoing signal to at least one of the first transmit antenna and the second transmit antenna based on the first control signal; and a first radio for receiving the first incoming signal from the first receive antenna and the second incoming signal from the second receive antenna, and for providing the first outgoing signal and the first control signal to the first switch.

DETAILED DESCRIPTION

Figure 1:
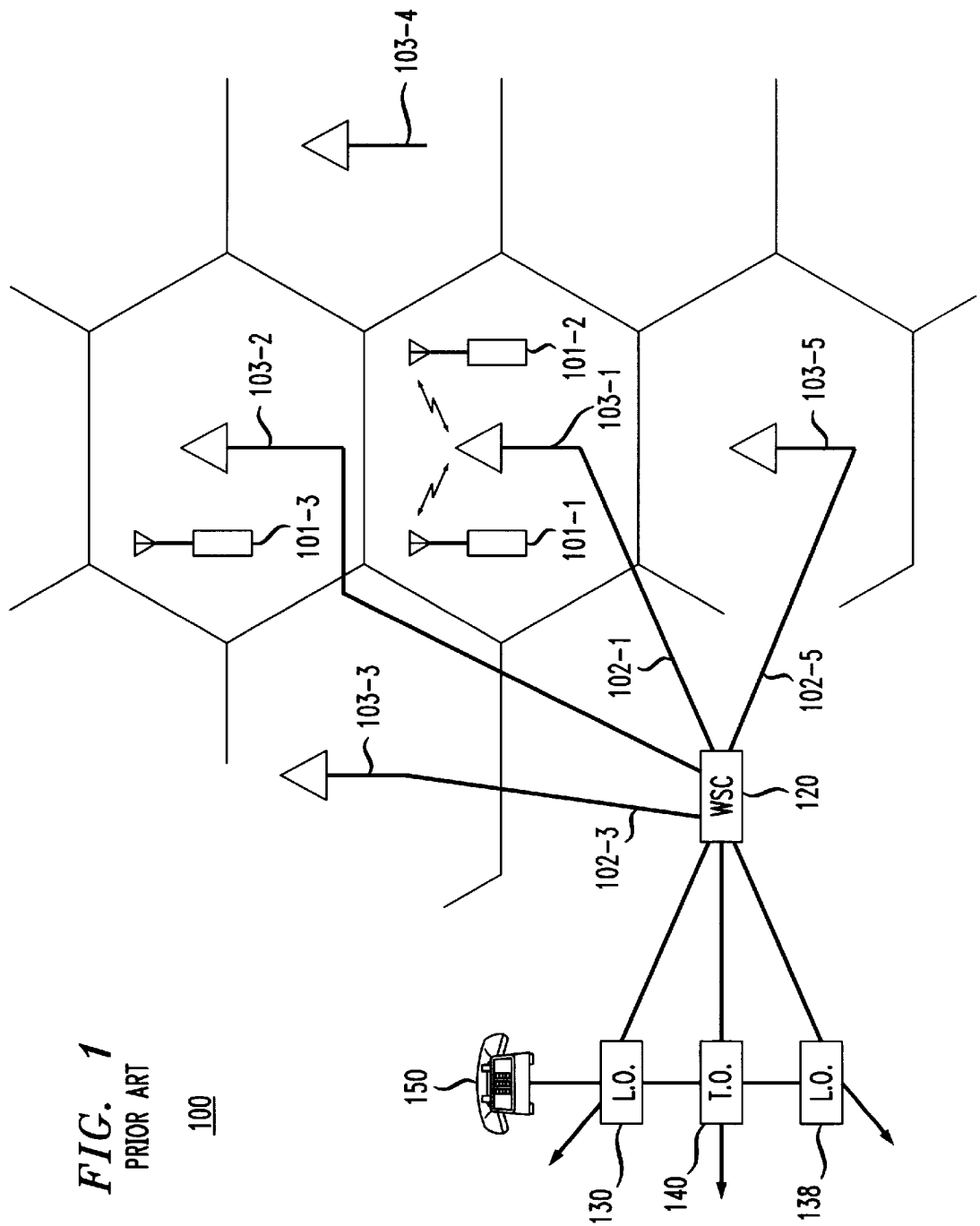
FIG. 1 depicts a schematic diagram of an wireless telecommunications system in the prior art.
Figure 2:
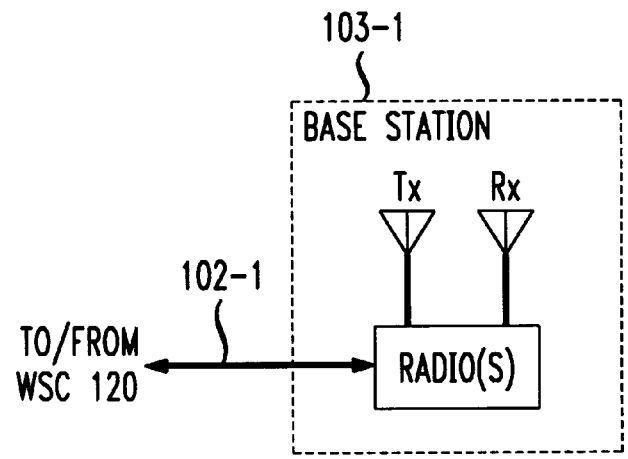
FIG. 2 depicts a block diagram of a first base station architecture in the prior art.
Figure 3:
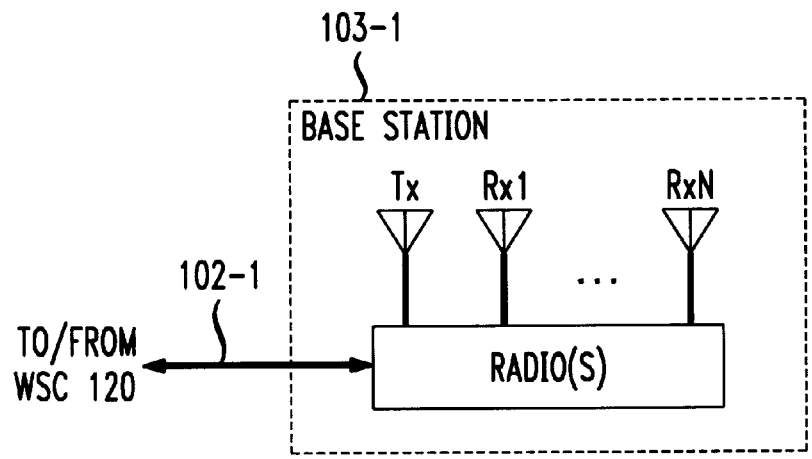
FIG. 3 depicts a block diagram of a second base station architecture in the prior art, which architecture supports receive diversity.
Figure 4:
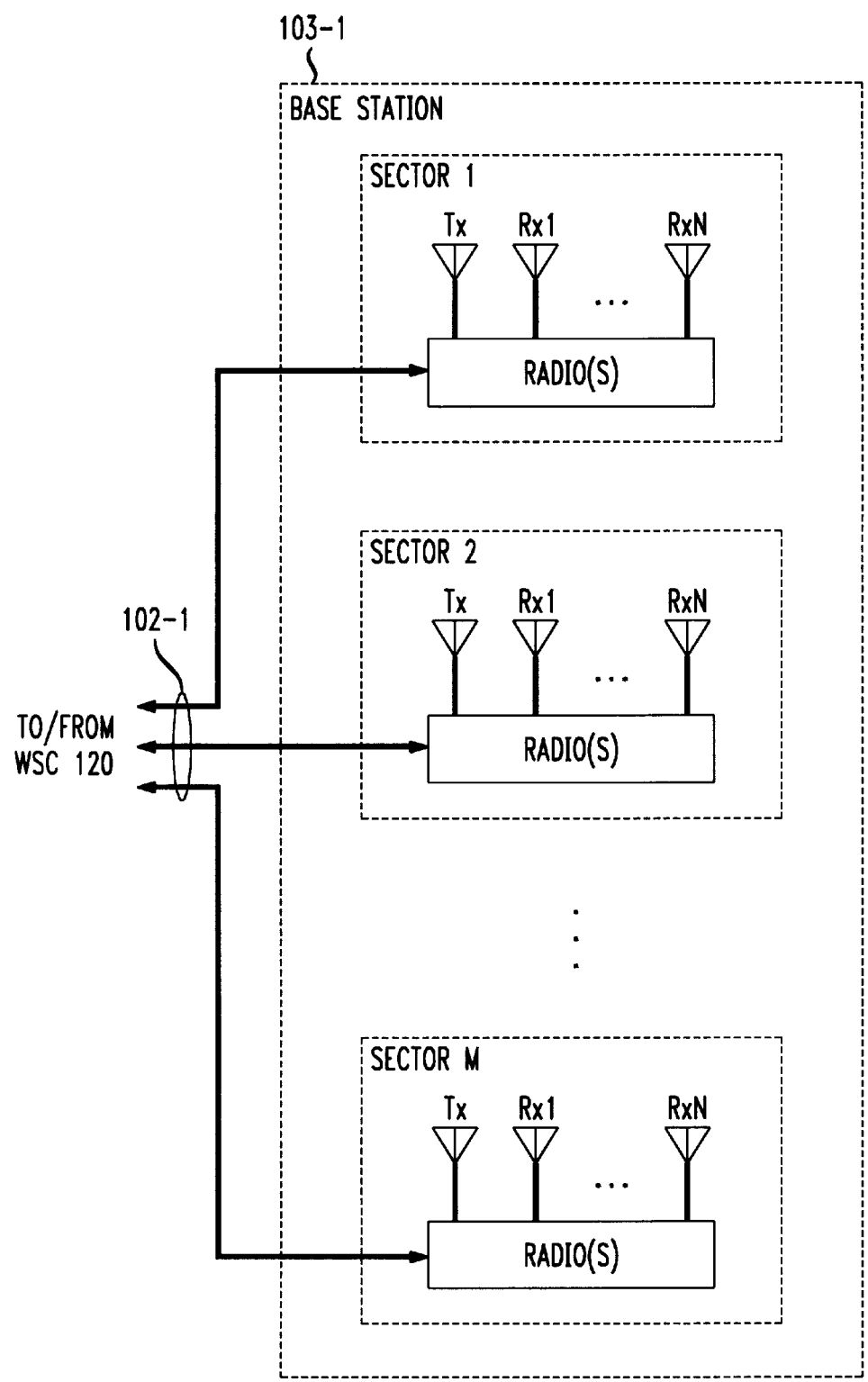
FIG. 4 depicts a block diagram of a third base station architecture in the prior art, which architecture supports receive diversity and sectorization.
Figure 5:
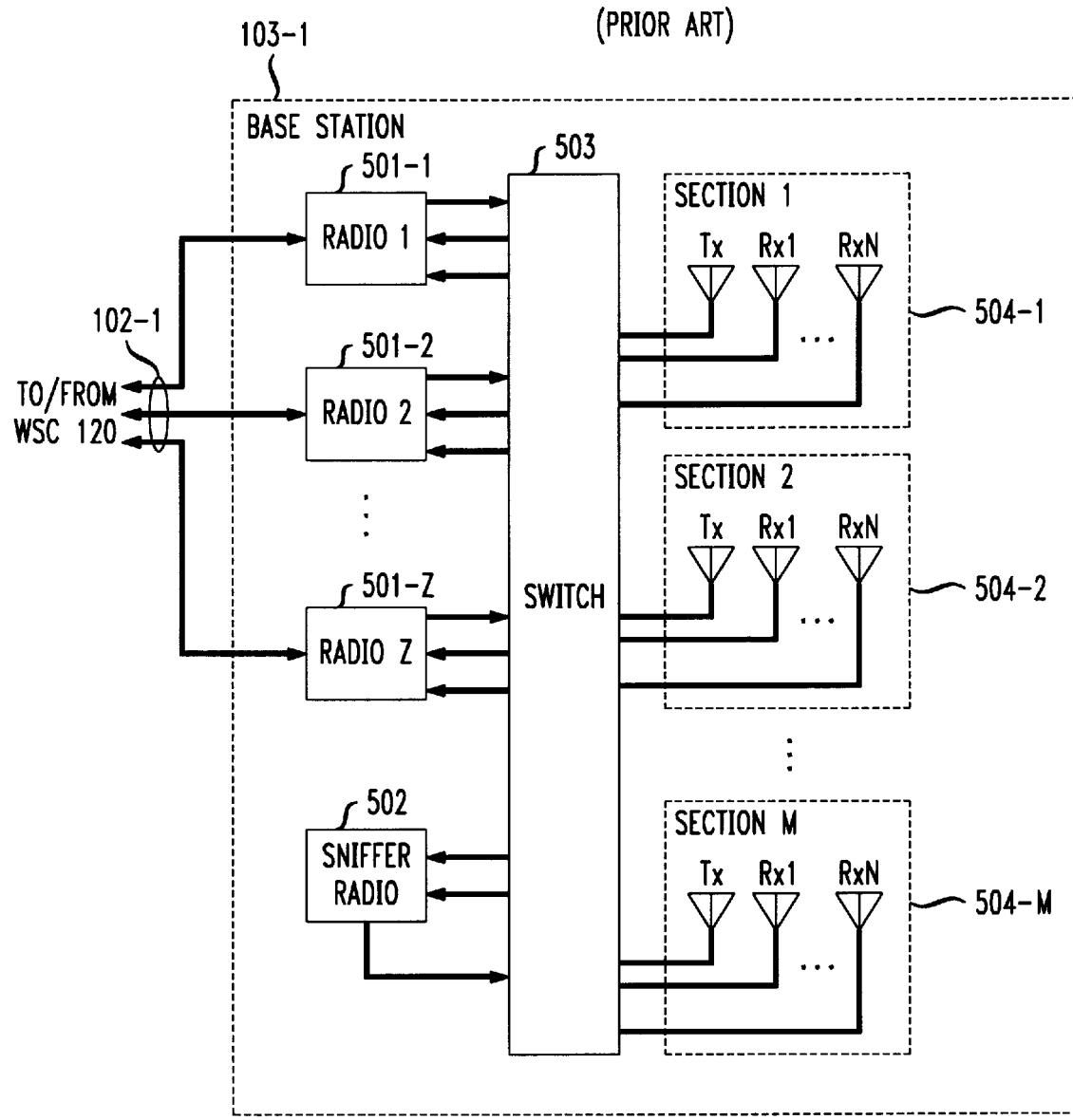
FIG. 5 depicts a block diagram of a fourth base station architecture in the prior art, which architecture supports receive diversity, sectorization and radio pooling.
Figure 6:
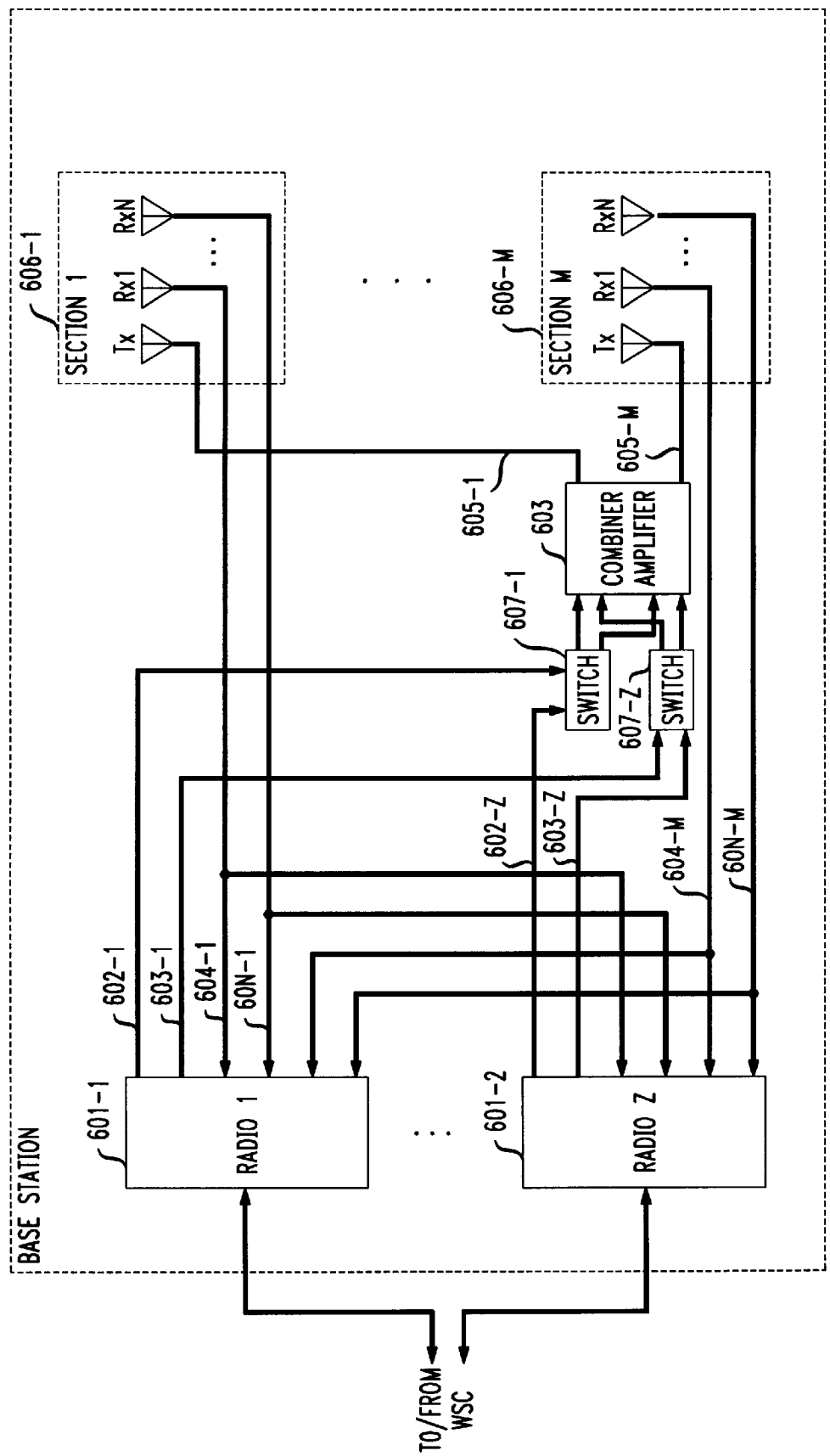
FIG. 6 depicts a block diagram of a base station architecture in accordance with the illustrative embodiment of the present invention.

FIG. 6 depicts a block diagram of a base station architecture in accordance with the illustrative embodiment of the present invention, which supports receive diversity, sectorization and radio pooling. The illustrative embodiment advantageously comprises: a plurality of radios 601-1 through 601-Z, M-way switches 607-1 through 607-Z, combiner/amplifier 603, M sets of sectorized transmit antennas, and M sets of receive antennas 606-1 through 606-M, interconnected as shown.

Although each transmit antenna is associated with a sector, each set of receive antennas can, but is not necessarily, also associated with a sector. Instead, in accordance with the illustrative embodiment of the present invention, each receive antenna can receive omni-directionally or can have a field of view that is wider or narrower than the sectors associated with the transmit antennas. Each set of N receive antennas captures N versions of an incoming signal from a wireless terminal (not shown).

The illustrative embodiment advantageously comprises Z radios, each of which is capable of receiving and demodulating one incoming signal of interest from a wireless terminal and of creating therefrom one or more baseband signals in accordance with the particular access scheme employed (e.g., frequency-division multiple access, time-division multiple access, code-division multiple-access, etc.). Each radio is also capable of transmitting those baseband signals to a wireless switching center, in well-known fashion.

Each radio advantageously comprises a diversity processor and a beamforming processor that are capable of increasing the fidelity of the incoming signal of interest by receiving N×M variations of the incoming signal (i.e., N variations from M sectors) and performing N×M-way diversity combining and/or beamforming, in well-known fashion, on those variations.

This architecture is advantageous for four reasons. First, no sniffer radio is needed. Second, no switch matrix is needed between the receive antennas and the respective radios. Third, diversity combining and/or beamforming is now possible across sector boundaries, and fourth, the additional cost incurred by radios that are capable of N×M-way diversity combining and beamforming is more than offset by the cost savings associated with the omission of the sniffer radio and switch matrix.

Each radio, radio i, for $1 \leq i \leq Z$, is advantageously capable of receiving one or more baseband signals from a wireless switching center and of creating an outgoing signal based on those baseband signals in accordance with a given multiplexing scheme (e.g., frequency-division multiplexing, time-division multiplexing, code-division multiplexing, etc.), in well-known fashion. That output signal is advantageously output from radio i to switch 607-i via lead 602-i.

Each radio is advantageously capable of analyzing the N×M variations of the incoming signal, in well-known fashion, to generate an estimate of the sector from which the incoming signal originates. This information is useful because each radio uses the estimate to generate a control signal, control signal #i on lead 603-i, to route the outgoing signal from the radio to the transmit antenna(s) associated with the sector(s) from which the radio estimates the incoming signal originates.

Each radio, radio i advantageously directs switch 607-i which transmit antenna to use by transmitting a control signal on lead 603-i to switch 607-i. M-way switch matrix 607-i, for $1 \leq i \leq Z$, advantageously receives from radio 601-i: (1) outgoing signal #i on lead 602-i, and (2) control signal #i on lead 603-i, and routes outgoing signal #i to one or more transmit antennas under the direction of control signal #i. It will be clear to those skilled in the art how to make and use M-way switch matrix 701-i.

The output(s) of switch 607-i are fed into combiner/amplifier 603, which combines two or more signals for the same transmit antenna and amplifies the signals prior to transmission.

It will be clear to those skilled in the art how to build each radio and switch 607-i.

Figure 7:
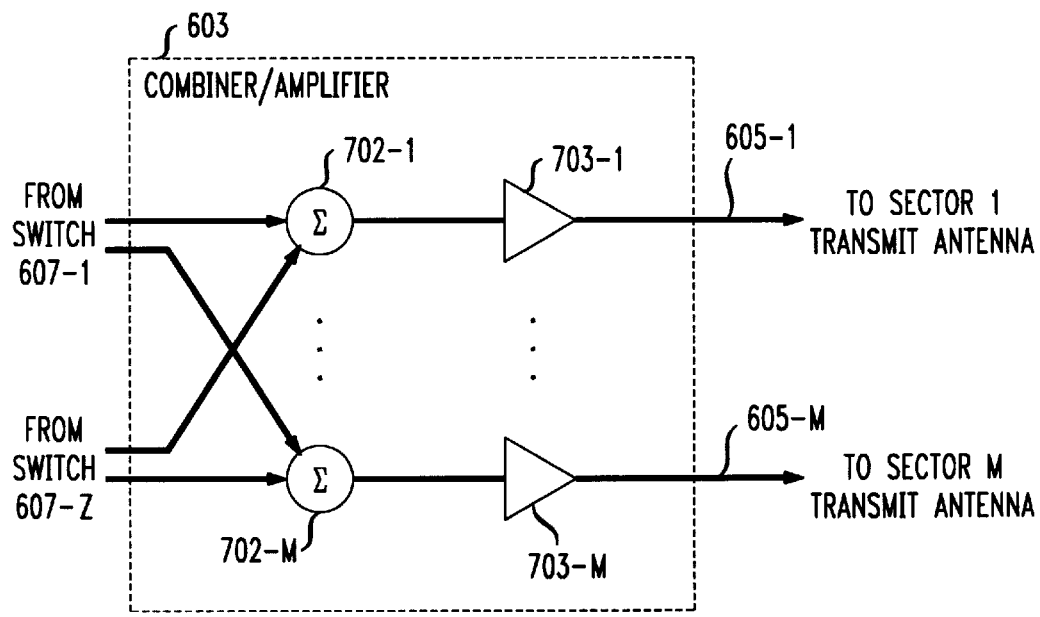
FIG. 7 depicts a block diagram of the details of the antenna router of FIG. 6.

FIG. 7 depicts a block diagram of amplifier/combiner 603, which advantageously comprises: M combiners 702-1 through 702-M and M power amplifiers 703-1 through 703-M. Combiner 702-j, for $1 \leq j \leq Z$, is uniquely associated with sector j and receives all of the outgoing signals intended for sector j and vector sums them in well-known fashion. The output of combiner 702-j is fed into power amplifier 703-j for amplification prior to radiation via sector j transmit antenna. It will be clear to those skilled in the art how to make and use antenna router 603.

Figure 8:
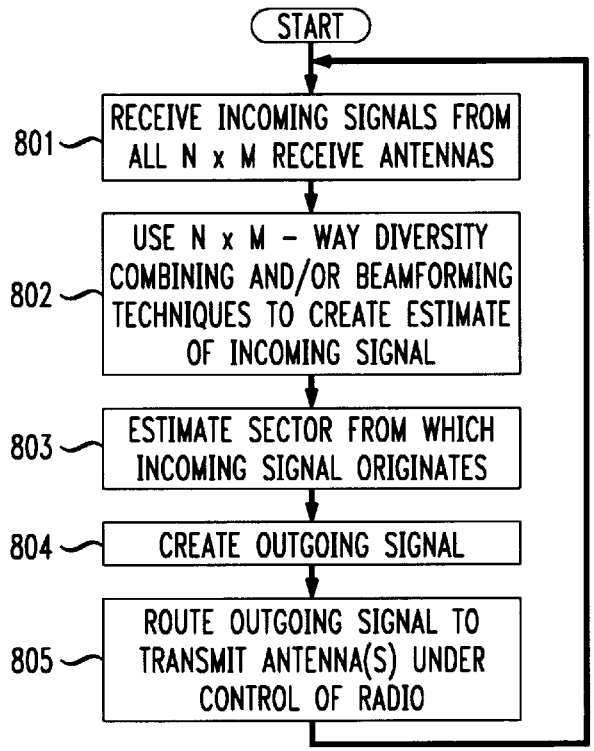
FIG. 8 depicts a block diagram of a flowchart of the operation of the illustrative embodiment of the present invention.

FIG. 8 depicts a flowchart of the operation of the illustrative embodiment of the present invention, which is summarized in five steps. It will be clear to those skilled in the art that the illustrative embodiment operates computationally like a multiprocessor computer and that aspects of all five steps are being performed simultaneously by one component of the illustrative embodiment or another at virtually all times. The pedagogical purpose of the flowchart is to highlight some of the causality associated with the operation of the illustrative embodiment.

At step 801, a radio receives N×M variations of an incoming signal from all N×M receive antennas, and at step 802 the radio uses N×M-way diversity combination and/or beamforming techniques to create an estimate of the incoming signal that is better than any one variation of the incoming signal.

At step 803, the radio analyzes the N×M variations of the incoming signal to create an estimate of the most likely sector or sectors from which the incoming signal originates, and at step 804 the radio generates an outgoing signal to the wireless terminal.

At step 805, the radio then directs antenna router 603 to route the outgoing signal to the transmit antenna(s) associated with the sector or sectors from which the incoming signal is believed to originate. From step 805, control returns to step 801.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. An apparatus comprising:

a first receive antenna for receiving a first incoming signal from a first sector;

a second receive antenna for receiving a second incoming signal from said first sector;

a third receive antenna for receiving a third incoming signal from a second sector;

a fourth receive antenna for receiving a fourth incoming signal from said second sector;

a first transmit antenna for transmitting into said first sector;

a second transmit antenna for transmitting into said second sector;

a first switch for receiving a first outgoing signal and a first control signal, and for routing said first outgoing signal to at least one of said first transmit antenna and said second transmit antenna based on said first control signal; and a first radio for concurrently receiving said first incoming signal from said first receive antenna, said second incoming signal from said second receive antenna, said third incoming signal from said third antenna, and said fourth incoming signal from said fourth antenna, for providing at least 4-way diversity combining on said first signal, said second signal, said third signal, and said fourth signal, and for providing said first outgoing signal and said first control signal to said first switch.

2. The apparatus of claim 1 further comprising:

a second switch for receiving a second outgoing signal and a second control signal, and for routing said second outgoing signal to at least one of said first transmit antenna and said second transmit antenna based on said second control signal; and a second radio for concurrently receiving said first incoming signal from said first receive antenna, said second incoming signal from said second receive antenna, said third incoming signal from said third antenna, and said fourth incoming signal from said fourth antenna, and for providing said second outgoing signal and said second control signal to said second switch.

3. The apparatus of claim 1 wherein said first radio comprises said first switch.

4. The apparatus of claim 1 wherein said first radio comprises a diversity processor for combining said first incoming signal from said first receive antenna, said second incoming signal from said second receive antenna, said third incoming signal from said third receive antenna, and said fourth incoming signal from said fourth receive antenna.

5. The apparatus of claim 1 wherein said first radio comprises a beamforming processor for combining said first incoming signal from said first receive antenna, said second incoming signal from said second receive antenna, said third incoming signal from said third receive antenna, and said fourth incoming signal from said fourth receive antenna.

6. An apparatus comprising:
- a first receive antenna for receiving a first incoming signal from a first sector;
- a second receive antenna for receiving a second incoming signal from a second sector;
- a first transmit antenna for transmitting into said first sector;
- a second transmit antenna for transmitting into said second sector;
- a first switch for receiving a first outgoing signal and a first control signal, and for routing said first outgoing signal to at least one of said first transmit antenna and said second transmit antenna based on said first control signal;
- a first radio for concurrently receiving said first incoming signal from said first receive antenna and said second incoming signal from said second receive antenna, for providing at least 4-way diversity combining on said first signal, said second signal, said third signal, and said fourth signal, and for providing said first outgoing signal and said first control signal to said first switch;
- a second switch for receiving a second outgoing signal and a second control signal, and for routing said second outgoing signal to at least one of said first transmit antenna and said second transmit antenna based on said second control signal; and
- a second radio for concurrently receiving said first incoming signal from said first receive antenna and said second incoming signal from said second receive antenna, and for providing said second outgoing signal and said second control signal to said second switch.

7. The apparatus of claim 6 wherein said first radio comprises a diversity processor for combining said first incoming signal from said first receive antenna and said second incoming signal from said second receive antenna.

8. The apparatus of claim 6 wherein said first radio comprises a beamforming processor for combining said first incoming signal from said first receive antenna and said second incoming signal from said second receive antenna.

9. The apparatus of claim 6 further comprising:
- a third receive antenna for receiving a third incoming signal from said first sector;
- a fourth receive antenna for receiving a fourth incoming signal from said second sector; and
- wherein said first radio also receives said third incoming signal from said third receive antenna, and said fourth incoming signal from said fourth receive antenna, and wherein said second radio also receives said third incoming signal from said third receive antenna, and said fourth incoming signal from said fourth receive antenna.

10. The apparatus of claim 9 wherein said first radio comprises a diversity processor for combining said first incoming signal from said first receive antenna, said second incoming signal from said second receive antenna, said third incoming signal from said third receive antenna, and said fourth incoming signal from said fourth receive antenna.

11. The apparatus of claim 9 wherein said first radio comprises a beamforming processor for combining said first incoming signal from said first receive antenna, said second incoming signal from said second receive antenna, said third incoming signal from said third receive antenna, and said fourth incoming signal from said fourth receive antenna.

* * * * *